(No Model.)

A. D. WHEELER.
ELECTRIC BATTERY.

No. 592,853. Patented Nov. 2, 1897.

WITNESSES.
Harry O. Robinson
George H. Clark

INVENTOR.
Alden D. Wheeler.
by B. J. Hayes atty.

UNITED STATES PATENT OFFICE.

ALDEN D. WHEELER, OF HYDE PARK, MASSACHUSETTS.

ELECTRIC BATTERY.

SPECIFICATION forming part of Letters Patent No. 592,853, dated November 2, 1897.

Application filed January 22, 1897. Serial No. 620,193. (No model.)

*To all whom it may concern:*

Be it known that I, ALDEN D. WHEELER, of Hyde Park, county of Norfolk, State of Massachusetts, have invented an Improvement in Electric Batteries, of which the following description, in connection with the accompanying drawings, is a specification, like letters on the drawings representing like parts.

This invention relates to electric batteries, and has for its object to provide means for closing the top of the jar and also means for supporting in elevated position the elements or electrodes contained in the jar, so that the lower ends thereof shall be raised a suitable distance above the bottom of the jar to prevent said lower ends from coming in contact with the deposit which accumulates at the bottom of the jar, which results in short-circuiting the battery.

My invention is especially adapted for use in connection with a storage battery of that kind wherein is employed a central element or electrode and a pair of elements or electrodes arranged one at each side of said central element or electrode.

In accordance with this invention the means for closing the jar consists, essentially, of two plates placed one upon the other, the lowermost plate having elongated openings extending inwardly from one end to receive the necks of the elements or electrodes and the uppermost plate having elongated openings extending inwardly from the other end to receive the necks of the elements or electrodes, and said plates when placed one upon the other completely close the open top of the jar and snugly embrace the necks of the elements or electrodes.

Upon the upper side of the uppermost plate vertical flanges or ribs are formed, upon which the elements or electrodes rest, they being thereby elevated a suitable distance in order that their lower ends may be raised sufficiently above the bottom of the jar to prevent coming in contact with the deposit which accumulates at the bottom of the jar.

Figure 1:
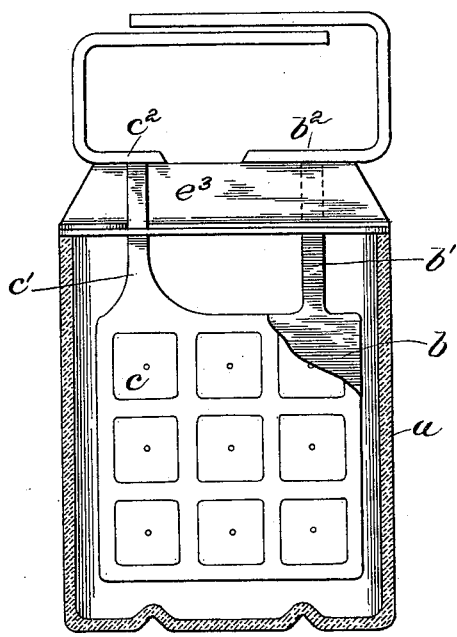
Figure 2:
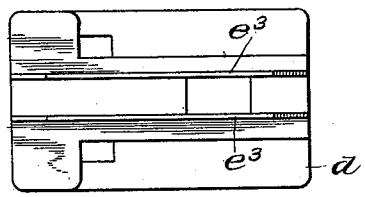
Figure 3:
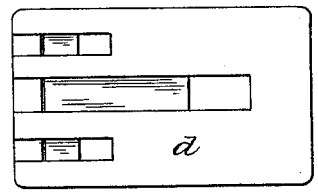
Figure 4:
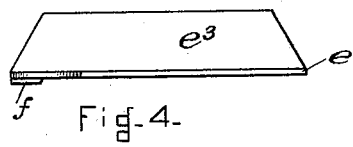
Figure 5:
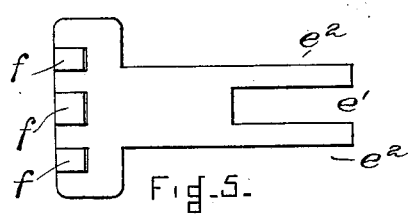

Figure 1 shows in vertical section an electric battery embodying this invention; Fig. 2, a plan view of the combined cover and support for the electrodes, the electrodes being shown in side elevation; Fig. 3, an under side view of the parts shown in Fig. 2; Fig. 4, an edge view of the uppermost plate; Fig. 5, an under side view of the uppermost plate, and Fig. 6 a plan view of the lowermost plate.

$a$ represents the jar, $b$ the central element or electrode, and $c$ the two side elements or electrodes, said elements or electrodes having necks $b'$ $c'$ and upper end connections $b^2$ $c^2$. Such an electric battery is a common form now on the market.

Figure 6:
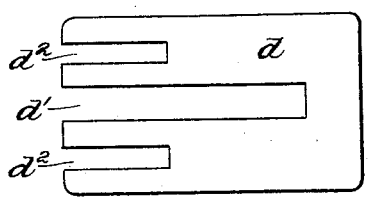

The cover consists of two plates $d\ e$, placed one upon the other, the lower one $d$ being made of a shape to substantially fit the opening at the top of the jar, as shown in Fig. 6, and the upper one $e$ being made of a shape to fit upon the lower plate, as shown in Fig. 5. Both of said plates will preferably be made of rubber. The lowermost plate $d$ is made as a flat plate having several elongated openings extending inwardly from one end, there being three such openings herein shown—as, for instance, a central opening $d'$ and two side openings $d^2$ $d^2$—and said openings extend inwardly from the left-hand end. This plate $d$ when placed upon the top of the jar is moved endwise in a direction toward the left, so that the necks $b'$ $c'$ of the elements or electrodes will enter said openings, and when the plate is in proper position said necks will occupy a position at the innermost ends of said openings. The uppermost plate $e$ is formed with an elongated central opening $e'$, which extends inwardly from the right-hand end of the plate, and said plate is cut away at the sides, as at $e^2$, to present recesses at such points, and said recesses likewise receive the necks of the elements or electrodes, and when in proper position said necks will occupy a position at the innermost ends of the recesses. When the uppermost plate $e$ is placed upon the lowermost plate $d$, the necks of the elements or electrodes will be snugly embraced and each plate will serve to close the openings in the other. A reasonably tight-fitting cover is thus produced. Upon the top of the uppermost plate $e$ suitable vertical flanges or ribs $e^3$ $e^3$ are formed or provided, upon which the connections $b^2$ $c^2$ of the elements or electrodes rest, and said flanges or ribs are made of suitable height to elevate said elements or electrodes, so that their lower ends shall occupy a position sufficiently above the bottom of the jar to prevent coming in contact with the accumulation of deposit and thereby short-circuiting the battery. Lugs $f$ are formed or provided on the under side of the plate $e$, which enter the openings $d'$ $d^2$ $d^2$ in the plate $d$.

It will be seen that this combined cover and support for the elements or electrodes is simple, being composed of but two parts, and hence may be easily and cheaply made, and also that the jar is quite tightly closed and the elements or electrodes sufficiently elevated to accomplish the desired results and that all the parts are readily removable.

I claim—

1. In an electric battery, a cover consisting of two plates, each having elongated openings extending inwardly from one end, and placed one upon the other, with their openings extending in opposite ways, substantially as described.

2. In an electric battery, a cover consisting of two plates, each having elongated openings extending inwardly from one end, and placed one upon the other, with their openings extending in opposite ways, and vertical flanges or ribs formed on the uppermost plate which serve as supports upon which the elements or electrodes rest, substantially as described.

3. In an electric battery, a cover for the jar composed of separable plates of insulating material formed to present openings for the necks of the elements or electrodes when put together and placed on the jar and having flanges or ribs upon which said elements or electrodes rest, substantially as described.

4. In an electric battery, a two-part cover of insulating material, the parts of which rest one upon the other and formed to present, when so disposed, openings for the necks of the electrodes, and vertical flanges or ribs formed upon the uppermost part upon which said electrodes rest and by which they are solely supported, substantially as described.

In testimony whereof I have signed my name to this specification in the presence of two subscribing witnesses.

ALDEN D. WHEELER.

Witnesses:
 GEORGE F. MILLIKEN,
 WILLIAM E. DECROW.